(12) United States Patent
Hasting et al.

(10) Patent No.: US 10,415,429 B2
(45) Date of Patent: Sep. 17, 2019

(54) PLANET GEARBOX WITH CYLINDRICAL ROLLER BEARING WITH HIGH DENSITY ROLLER PACKING

(71) Applicant: General Electric Company, Schenectady, NY (US)

(72) Inventors: William Howard Hasting, Cincinnati, OH (US); Donald Albert Bradley, Cincinnati, OH (US); Joseph Robert Dickman, Monroe, OH (US)

(73) Assignee: General Electric Company, Schenectady, NY (US)

( * ) Notice: Subject to any disclaimer, the term of this patent is extended or adjusted under 35 U.S.C. 154(b) by 653 days.

(21) Appl. No.: 14/865,265

(22) Filed: Sep. 25, 2015

(65) Prior Publication Data

US 2017/0089219 A1     Mar. 30, 2017

(51) Int. Cl.
     *F01D 5/06*        (2006.01)
     *F01D 25/16*      (2006.01)
     (Continued)

(52) U.S. Cl.
     CPC ............... *F01D 25/16* (2013.01); *F01D 5/06* (2013.01); *F01D 15/12* (2013.01); *F02C 7/36* (2013.01); *F04D 29/321* (2013.01); *F04D 29/325* (2013.01); *F16C 19/28* (2013.01); *F16C 33/34* (2013.01); *F16H 1/28* (2013.01); *F16H 57/08* (2013.01); *F05D 2220/32* (2013.01); *F05D 2240/50* (2013.01); *F05D 2260/40311* (2013.01); *F05D 2300/20* (2013.01);
     (Continued)

(58) Field of Classification Search
None
See application file for complete search history.

(56) References Cited

U.S. PATENT DOCUMENTS 1,329,720 A    2/1920   Meier
2,652,296 A    9/1953   Palmgren et al.
(Continued)

FOREIGN PATENT DOCUMENTS

CN            1773135 A      5/2006
CN       101865279 A    10/2010
(Continued)

OTHER PUBLICATIONS

Fang, et al., filed May 19, 2015, U.S. Appl. No. 14/715,717.
(Continued)

*Primary Examiner* — John Fox
(74) *Attorney, Agent, or Firm* — Dority & Manning, P.A.

(57) ABSTRACT

A planet gearbox is provided for connection to a carrier of an epicyclic gearing arrangement with a single input and single output and including a sun gear, a ring gear and at least one double helix planet gear rotatable on a cylindrical roller bearing with a cage having a cross-web thickness of 15% to 25% of the diameter of the cylindrical rollers and an L/D ratio exceeding 1.0. A gas turbine engine includes a fan and LP shaft, which couples a compressor to a turbine. An epicyclic gearing arrangement has a single input from the LP shaft coupled to a sun gear, a single output coupled to the fan's shaft, and a planet bearing cage having a cross-web thickness measuring 15% to 25% of the roller's diameter.

20 Claims, 6 Drawing Sheets

(51) Int. Cl.
| | |
|---|---|
| *F01D 15/12* | (2006.01) |
| *F04D 29/32* | (2006.01) |
| *F16H 1/28* | (2006.01) |
| *F16H 57/08* | (2006.01) |
| *F02C 7/36* | (2006.01) |
| *F16C 19/28* | (2006.01) |
| *F16C 33/34* | (2006.01) |
| *F16C 33/48* | (2006.01) |

(52) U.S. Cl.
CPC ........ *F16C 33/485* (2013.01); *F16C 2206/40* (2013.01); *F16C 2240/46* (2013.01); *F16C 2240/60* (2013.01); *F16C 2360/23* (2013.01); *F16C 2361/61* (2013.01); *F16H 2057/085* (2013.01); *Y02T 50/671* (2013.01)

(56) References Cited

U.S. PATENT DOCUMENTS

| | | | |
|---|---|---|---|
| 2,853,948 A | 9/1958 | Aspelin | |
| 3,325,232 A | 6/1967 | Pabst et al. | |
| 3,692,372 A | 9/1972 | Pineo | |
| 4,177,693 A | 12/1979 | Ivanko et al. | |
| 4,235,485 A | 11/1980 | Reiter | |
| 4,428,628 A | 1/1984 | Brown | |
| 4,479,682 A | 10/1984 | Olivier | |
| 4,891,934 A | 1/1990 | Huelster | |
| 4,968,158 A | 11/1990 | Atkinson et al. | |
| 4,971,457 A | 11/1990 | Carlson | |
| 5,119,905 A | 6/1992 | Murray | |
| 5,121,599 A | 6/1992 | Snyder et al. | |
| 5,121,815 A | 6/1992 | Franscois et al. | |
| 5,165,804 A * | 11/1992 | Fisher | F16C 33/3806 384/492 |
| 5,272,868 A | 12/1993 | Ciokajlo et al. | |
| 5,441,351 A | 8/1995 | Grunze | |
| 5,597,243 A * | 1/1997 | Kaiser | F16C 19/40 384/551 |
| 6,058,694 A | 5/2000 | Ackerman et al. | |
| 6,979,131 B1 | 12/2005 | Lippert et al. | |
| 6,997,297 B2 * | 2/2006 | Bartley | F16D 63/00 188/82.84 |
| 7,220,060 B2 * | 5/2007 | Kono | F16C 33/46 384/572 |
| 7,293,920 B2 | 11/2007 | Arena | |
| 7,458,723 B2 * | 12/2008 | Menges | F16C 29/065 384/13 |
| 7,490,460 B2 | 2/2009 | Moniz et al. | |
| 7,766,555 B2 | 8/2010 | Kono et al. | |
| 7,883,438 B2 | 2/2011 | McCune | |
| 1,436,734 A1 | 4/2011 | Stoffer | |
| 7,918,649 B2 | 4/2011 | Nakagawa et al. | |
| 8,057,105 B2 * | 11/2011 | Earthrowl | F16C 19/26 384/573 |
| 8,075,438 B2 | 12/2011 | Vetters et al. | |
| 8,083,030 B2 | 12/2011 | Portlock | |
| 8,256,576 B2 | 9/2012 | Glahn et al. | |
| 8,261,527 B1 | 9/2012 | Stearns et al. | |
| 8,348,803 B2 | 1/2013 | Matsuoka et al. | |
| 8,393,799 B2 | 3/2013 | Dahl | |
| 8,398,525 B2 | 3/2013 | Matsuoka et al. | |
| 8,517,672 B2 | 8/2013 | McCooey | |
| 8,523,451 B2 * | 9/2013 | Ozu | F16C 19/26 384/551 |
| 8,535,009 B2 | 9/2013 | Hofmann | |
| 8,740,464 B2 | 6/2014 | Berns | |
| 8,747,272 B2 | 6/2014 | Imai et al. | |
| 8,777,792 B2 | 7/2014 | Imai et al. | |
| 8,869,940 B2 | 10/2014 | Johnson et al. | |
| 8,968,148 B2 | 3/2015 | Matsuoka et al. | |
| 8,969,148 B2 | 3/2015 | Vinet et al. | |
| 8,985,277 B2 | 3/2015 | Hetherington et al. | |
| 9,038,779 B2 | 5/2015 | McCune et al. | |
| 9,850,948 B2 * | 12/2017 | Hofmann | F16C 33/6614 |
| 2004/0234184 A1 * | 11/2004 | Koyama | F16C 19/26 384/572 |
| 2005/0041901 A1 | 2/2005 | Yakura et al. | |
| 2005/0148425 A1 | 7/2005 | Nakagawa et al. | |
| 2008/0121376 A1 | 5/2008 | Schwarz et al. | |
| 2009/0046974 A1 * | 2/2009 | Omoto | F16C 33/513 384/577 |
| 2010/0027932 A1 | 2/2010 | Fujiwara | |
| 2010/0054648 A1 * | 3/2010 | Oishi | F16C 19/26 384/548 |
| 2010/0107648 A1 | 5/2010 | Bulin et al. | |
| 2011/0030385 A1 | 2/2011 | Ellans et al. | |
| 2013/0017089 A1 | 1/2013 | Stiesdal | |
| 2013/0047624 A1 | 2/2013 | Suciu et al. | |
| 2013/0129269 A1 | 5/2013 | Grehn | |
| 2013/0192258 A1 | 8/2013 | Kupratis et al. | |
| 2013/0269479 A1 | 10/2013 | Van Der Merwe et al. | |
| 2013/0318939 A1 | 12/2013 | Parnin et al. | |
| 2014/0016892 A1 * | 1/2014 | Kiyosawa | F16C 33/467 384/576 |
| 2014/0075916 A1 | 3/2014 | Augros | |
| 2014/0109589 A1 | 4/2014 | Pritchard, Jr. et al. | |
| 2014/0161591 A1 | 6/2014 | Venter | |
| 2014/0241851 A1 | 8/2014 | Demitraszek et al. | |
| 2014/0256494 A1 | 9/2014 | Lewis et al. | |
| 2015/0030273 A1 | 1/2015 | Sebald et al. | |
| 2015/0043862 A1 * | 2/2015 | Kajikawa | F16C 33/4676 384/572 |
| 2015/0377343 A1 | 12/2015 | Fugel et al. | |
| 2017/0089218 A1 | 3/2017 | Hasting et al. | |
| 2017/0108113 A1 | 4/2017 | Hasting et al. | |

FOREIGN PATENT DOCUMENTS

| | | |
|---|---|---|
| CN | 103261592 A | 8/2013 |
| CN | 104220729 A | 12/2014 |
| DE | 10 2005 029 075 A1 | 12/2006 |
| DE | 10 2013 207 780 A1 | 8/2014 |
| EP | 1 389 671 A2 | 2/2004 |
| EP | 1574731 A2 | 9/2005 |
| EP | 2 538 055 A2 | 12/2012 |
| EP | 2 559 913 A1 | 2/2013 |
| FR | 2 970 504 A1 | 7/2012 |
| GB | 660 399 A | 7/1951 |
| GB | 1 550 789 A | 8/1979 |
| JP | H01-110825 A | 4/1989 |
| JP | H04-318230 A | 11/1992 |
| JP | H08-511605 A | 12/1996 |
| JP | 2005-054871 A | 3/2005 |
| JP | 2007263357 A | 10/2007 |
| JP | 2010-525234 A | 7/2010 |
| WO | 2012/049322 A1 | 4/2012 |
| WO | 2012069274 A1 | 5/2012 |
| WO | WO 2012/069274 A1 | 5/2012 |
| WO | 2012/098324 A1 | 7/2012 |
| WO | 2013/029683 A1 | 3/2013 |
| WO | 2014/123857 A1 | 8/2014 |
| WO | 2014/123863 A2 | 8/2014 |
| WO | 2014/152347 A2 | 9/2014 |
| WO | 2015/026899 A1 | 2/2015 |
| WO | 2015/055291 A1 | 4/2015 |

OTHER PUBLICATIONS

Hasting, et al., filed Oct. 19, 2015, U.S. Appl. No. 14/886,372.
Tompkins, et al., filed Nov. 30, 2016, U.S. Appl. No. 15/364,294.
Hasting, et al., filed Sep. 25, 2015, U.S. Appl. No. 14/865,239.
Notification of Reasons for Refusal issued in connection with corresponding JP Application No. 2016-17907 dated Nov. 7, 2017.
European Search Report and Opinion issued in connection with Corresponding EP Application No. 16190098.0 dated Feb. 7, 2017.
GE Related Case Form.
Search Report and Opinion issued in connection with related IT Application No. 102015000078920 dated Aug. 24, 2016.
Extended European Search Report and Opinion issued in connection with corresponding EP Application No. 16170161.0 dated Oct. 24, 2016.

(56) References Cited

OTHER PUBLICATIONS

Office Action issued in connection with related CA Application No. 2928973 dated Mar. 13, 2017.
Extended European Search Report and Opinion issued in connection with related EP Application No. 16193771.9 dated Mar. 23, 2017.
Extended European Search Report and Opinion issued in connection with related EP Application No. 16190097.2 dated Mar. 23, 2017.
Extended European Search Report and Opinion issued in connection with related EP Application No. 16200478.2 dated Apr. 5, 2017.
Japanese Search Report issued in connection with related JP Application No. 2016-095708 dated Apr. 21, 2017.
Notification of Reasons for Refusal issued in connection with related JP Application No. 2016-095708 dated May 9, 2017.
First Office Action and Search issued in connection with related CN Application No. 201610333609.X dated Jun. 20, 2017.
Decision to Grant issued in connection with related JP Application No. 2016-095708 dated Jul. 4, 2017.
Office Action issued in connection with related CA Application No. 2942693 dated Jul. 26, 2017.
William Howard Hasting et al., filed Sep. 25, 2015, U.S. Appl. No. 14/865,239.
William Howard Hasting et al., filed Oct. 19, 2015, U.S. Appl. No. 14/886,372.
Office Action issued in connection with corresponding CA Application No. 2941839 dated Apr. 20, 2018.
Machine Translation and First Office Action and Search issued in connection with corresponding CN Application No. 201610843480.7 dated Sep. 27, 2018.

\* cited by examiner

PLANET GEARBOX WITH CYLINDRICAL ROLLER BEARING WITH HIGH DENSITY ROLLER PACKING

FIELD OF THE INVENTION

The present subject matter relates generally to a cylindrical roller bearing, or more particularly to a cylindrical roller bearing for the planet gear in an epicyclic gearbox in a gas turbine engine.

BACKGROUND OF THE INVENTION

A gas turbine engine generally includes a fan and a core arranged in flow communication with one another with the core disposed downstream of the fan in the direction of the flow through the gas turbine. The core of the gas turbine engine generally includes, in serial flow order, a compressor section, a combustion section, a turbine section, and an exhaust section. With multi-shaft gas turbine engines, the compressor section can include a high pressure compressor (HP compressor) disposed downstream of a low pressure compressor (LP compressor), and the turbine section can similarly include a low pressure turbine (LP turbine) disposed downstream of a high pressure turbine (HP turbine). With such a configuration, the HP compressor is coupled with the HP turbine via a high pressure shaft (HP shaft), and the LP compressor is coupled with the LP turbine via a low pressure shaft (LP shaft).

In operation, at least a portion of air over the fan is provided to an inlet of the core. Such portion of the air is progressively compressed by the LP compressor and then by the HP compressor until the compressed air reaches the combustion section. Fuel is mixed with the compressed air and burned within the combustion section to provide combustion gases. The combustion gases are routed from the combustion section through the HP turbine and then through the LP turbine. The flow of combustion gasses through the turbine section drives the HP turbine and the LP turbine, each of which in turn drives a respective one of the HP compressor and the LP compressor via the HP shaft and the LP shaft. The combustion gases are then routed through the exhaust section, e.g., to atmosphere.

The LP turbine drives the LP shaft, which drives the LP compressor. In addition to driving the LP compressor, the LP shaft can drive the fan through a fan gearbox of an epicyclic gearing arrangement, which allows the fan to be rotated at fewer revolutions per unit of time than the rotational speed of the LP shaft for greater efficiency. The fan gearbox rotatably supports a sun gear that is disposed centrally with respect to a ring gear and a plurality of planet gears, which are disposed around the sun gear and engage between the sun gear and the ring gear. The LP shaft provides the input to the epicyclic gearing arrangement by being coupled to the sun gear, while the fan is coupled to rotate in unison with the carrier of the planet gears. Each planet gear meshes with the sun gear and with the ring gear, which is held stationary. The shaft of the fan is rotatable on its own bearing that is housed in a sun gearbox, which is also called the fan gearbox that is fixed to the rotationally central region of a carrier. Each planet gear is rotatable on its own bearing that is housed within a planet gearbox, which is fixed to the peripheral region of the carrier.

For any given gas turbine engine application, the planet gears are designed to provide a set reduction ratio between the rotational speed of the LP shaft and the rotational speed of the fan shaft. Because each planet gearbox that houses each planet gear is disposed within the flow path of the gas turbine engine, the challenge is to design on the one hand a reliable and robust planet gearbox that meets all flight conditions of the engine while on the other hand designing a planet gearbox that is compact sufficiently to fit inside the flow path in a way that does not require the entire engine size to be larger and heavier than otherwise would be needed in order to accommodate the planet gearbox.

Ceramic rolling elements are lighter in weight and known to provide a longer life than steel rollers, however ceramic rolling elements are used in the form of ball roller bearings or spherical roller bearings, which are not axially compliant and therefore not compatible with some helical gear configurations.

Accordingly, a gas turbine engine having one or more components for reducing the envelope required for the epicyclic gearing between the fan and the LP shaft would be useful. Specifically, a gas turbine engine having one or more components for reducing the envelope required for the planet gearboxes housing the planet gears of the planetary gearing would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a bearing for a planet gear of the power gearbox of a gas turbine engine is provided. The power gearbox includes an epicyclic gearing arrangement that has at least one planet bearing. The LP shaft of a turbofan engine provides the rotational input to the power gearbox, and the output from the power gearbox is provided to rotate the fan shaft of the turbofan engine. In one exemplary planetary embodiment, each planet gear has an outer race that includes a gearing surface that meshes with a sun gear input and a stationary ring gear to impart an output of reduced rotational speed to the carrier of the planet gears. In another exemplary star embodiment, each planet gear has an outer race that includes a gearing surface that meshes with a sun gear input while the carrier is held stationary to impart an output of reduced rotational speed to the ring gear.

The planet bearing is inner-race-guided, and the inner race desirably is a single piece having at least one roller track. For each respective roller track, a respective roller cage is disposed between the inner race and the outer race. The teeth on each of the planet gear, the sun gear and the ring gear desirably are arranged in a double helical pattern that restrains the planet gear axially to both the sun gear and the ring gear. The planet bearing uses a plurality of cylindrical rollers, which have outer cylindrical surfaces that rotatably contact both the inner race and the outer race, which is formed by the cylindrical inner surface of the planet gear. The roller cage is designed with a small clearance to the inner race and has a cross-web thickness of 15% to 25% of the diameter of the cylindrical rollers, which desirably have an L/D ratio exceeding 1.0 and desirably more than 1.3 times the roller diameter and up to and including 1.8 times the diameter.

In another exemplary embodiment of the present disclosure, a gas turbine engine is provided with a power gearbox that includes planet gears rotatably supported by a planet bearing. The gas turbine engine includes a compressor section having at least one compressor and a turbine section located downstream of the compressor section and including at least one turbine. The compressor section can include a low pressure compressor and a high pressure downstream of the low pressure compressor. The turbine section includes a high pressure (HP) turbine and a low pressure (LP) turbine downstream of the HP turbine. The gas turbine engine also includes a low pressure shaft mechanically coupling the low pressure compressor to the low pressure turbine via an epicyclic gearing arrangement, which includes one or more planet bearings as summarily described above and in more detail hereinafter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF ILLUSTRATIVE EMBODIMENTS

Figure 1:
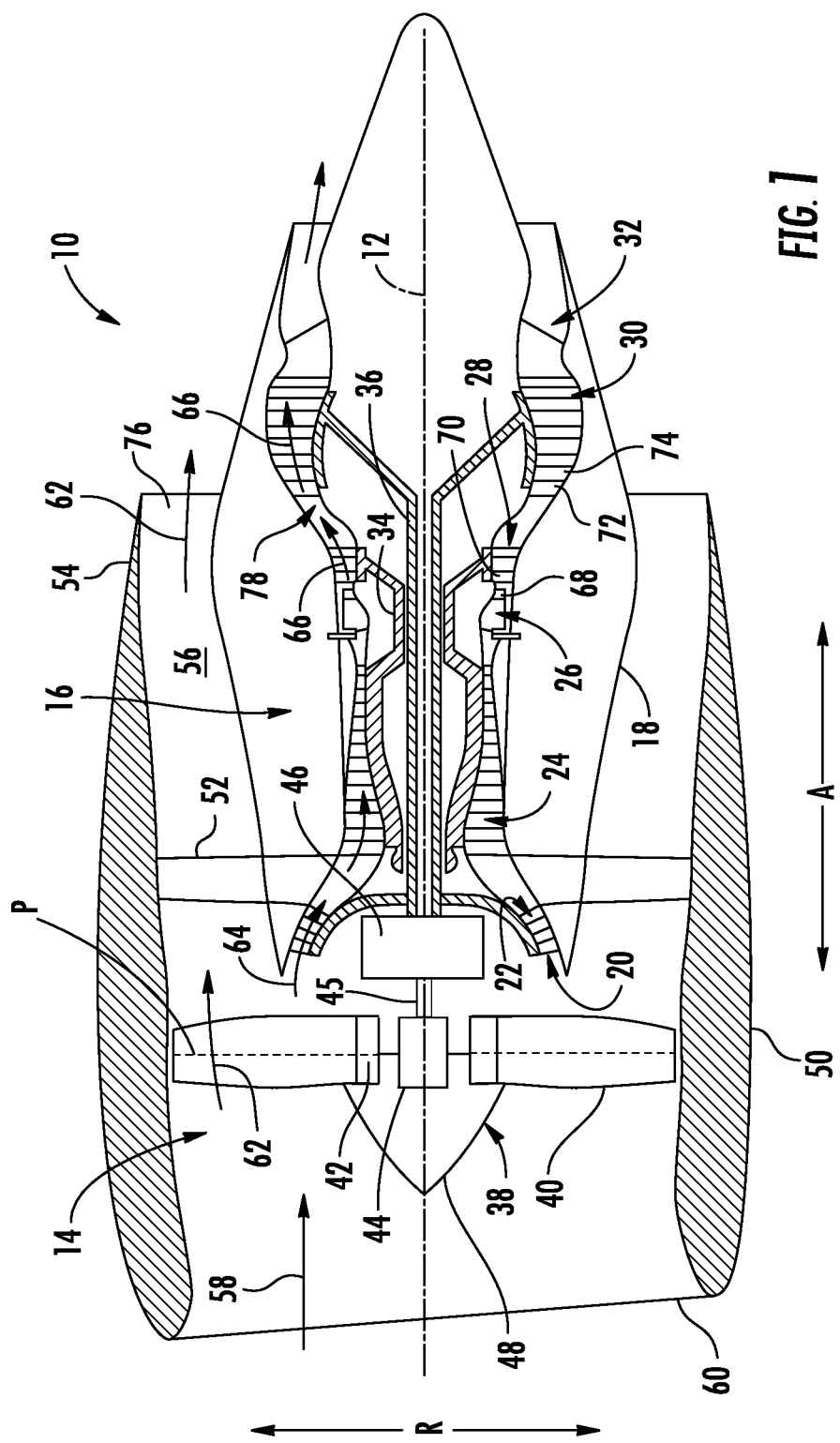
FIG. 1 is a schematic cross-sectional view of an exemplary gas turbine engine according to various embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. As used herein, the fluid can be a gas such as air or a liquid such as a lubricant.

Referring now to the drawings, wherein identical numerals indicate the same elements throughout the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R that is normal to the axial direction A. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. As schematically shown in FIG. 1, the outer casing 18 encases, in serial flow relationship, a compressor section including a booster or low pressure (LP) compressor 22 followed downstream by a high pressure (HP) compressor 24; a combustion section 26; a turbine section including a high pressure (HP) turbine 28 followed downstream by a low pressure (LP) turbine 30; and a jet exhaust nozzle section 32. A high pressure (HP) shaft or spool 34 drivingly connects the HP turbine 28 to the HP compressor 24 to rotate them in unison. A low pressure (LP) shaft or spool 36 drivingly connects the LP turbine 30 to the LP compressor 22 to rotate them in unison. The compressor section, combustion section 26, turbine section, and nozzle section 32 together define a core air flowpath.

For the embodiment depicted in FIG. 1, the fan section 14 includes a variable pitch fan 38 having a plurality of fan blades 40 coupled to a disk 42 in a spaced apart manner. As depicted in FIG. 1, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 via a fan shaft 45 that is powered by the LP shaft 36 across a power gear box 46. The power gear box 46 includes a plurality of gears for adjusting the rotational speed of the fan shaft 45 and thus the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Alternatively, the nacelle 50 also may be supported by struts of a structural fan frame. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrow 62 is directed or routed into the bypass airflow passage 56, and a second portion of the air 58 as indicated by arrow 64 is directed or routed into the upstream section of the core air flowpath, or more specifically into the inlet 20 of the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where the highly pressurized air is mixed with fuel and burned to provide combustion gases 66.

The combustion gases 66 are routed into and expand through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed into and expand through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and rotation of the fan 38 via the power gearbox 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured in any other suitable manner (e.g., as a fixed pitch fan) and further may be supported using any other suitable fan frame configuration. Moreover, it also should be appreciated that in other exemplary embodiments, any other suitable LP compressor 22 configuration may be utilized. It also should be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbocore engine, turbojet engine, etc.

Figure 2:
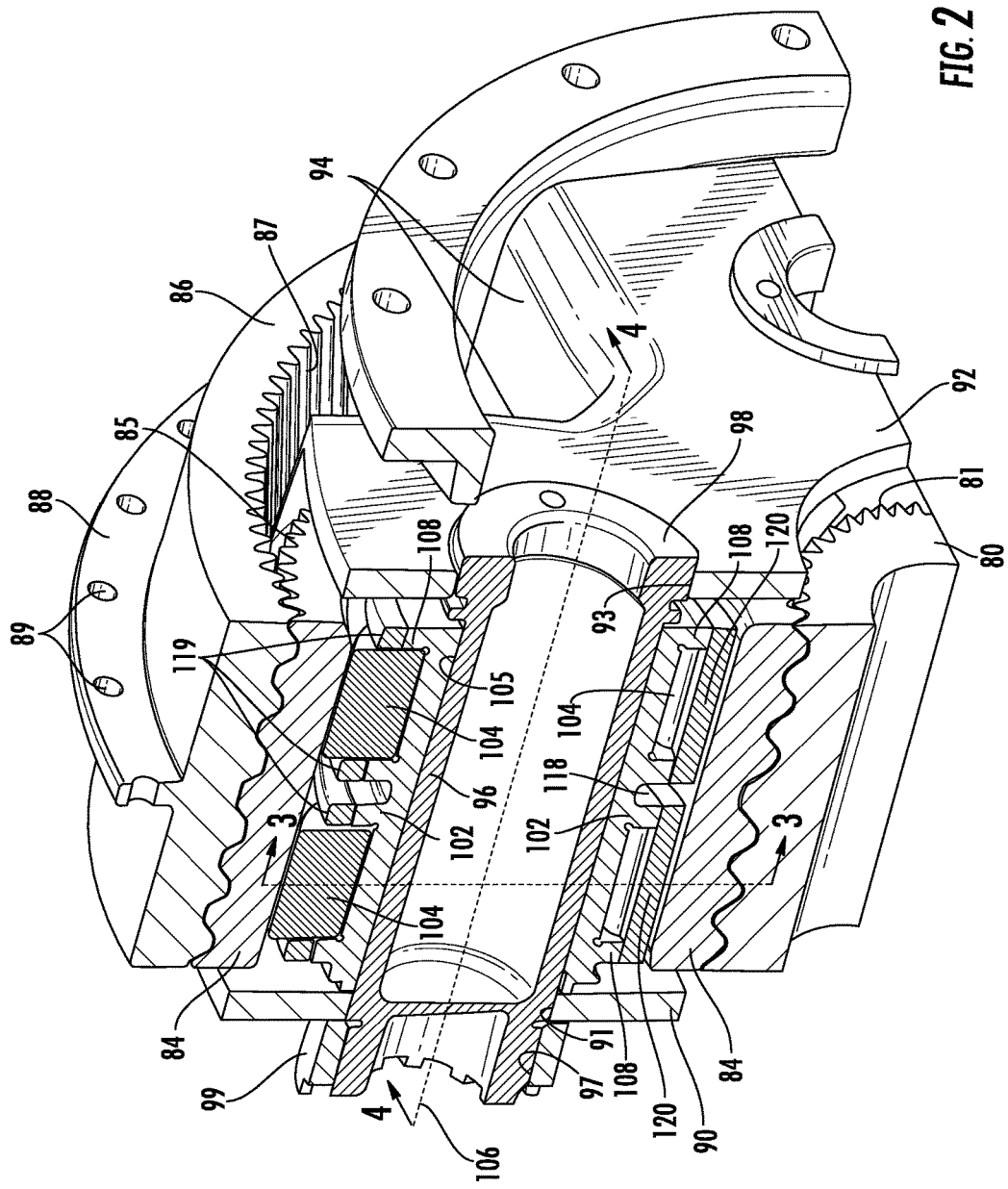
FIG. 2 is a view partially in perspective and partially in cross-section of a one quarter segment of an epicyclic gearing arrangement between the fan shaft and the LP shaft of the exemplary gas turbine engine of FIG. 1.

FIG. 2 depicts portions of the power gearbox 46 constructed according to an aspect of the present disclosure. For purposes of illustrating features of the planet bearing that rotatably supports each planet gear, FIG. 2 illustrates a view rendered partly in perspective and partly in cross-section and focused on the planet bearing portions of a one quarter section of an exemplary embodiment of a planetary gearbox configuration that desirably serves as a component of the power gearbox 46. The power gearbox 46 is an epicyclic type and has a central axis of rotation that is coincident with the longitudinal axis 12 shown in FIG. 1.

Figure 5:
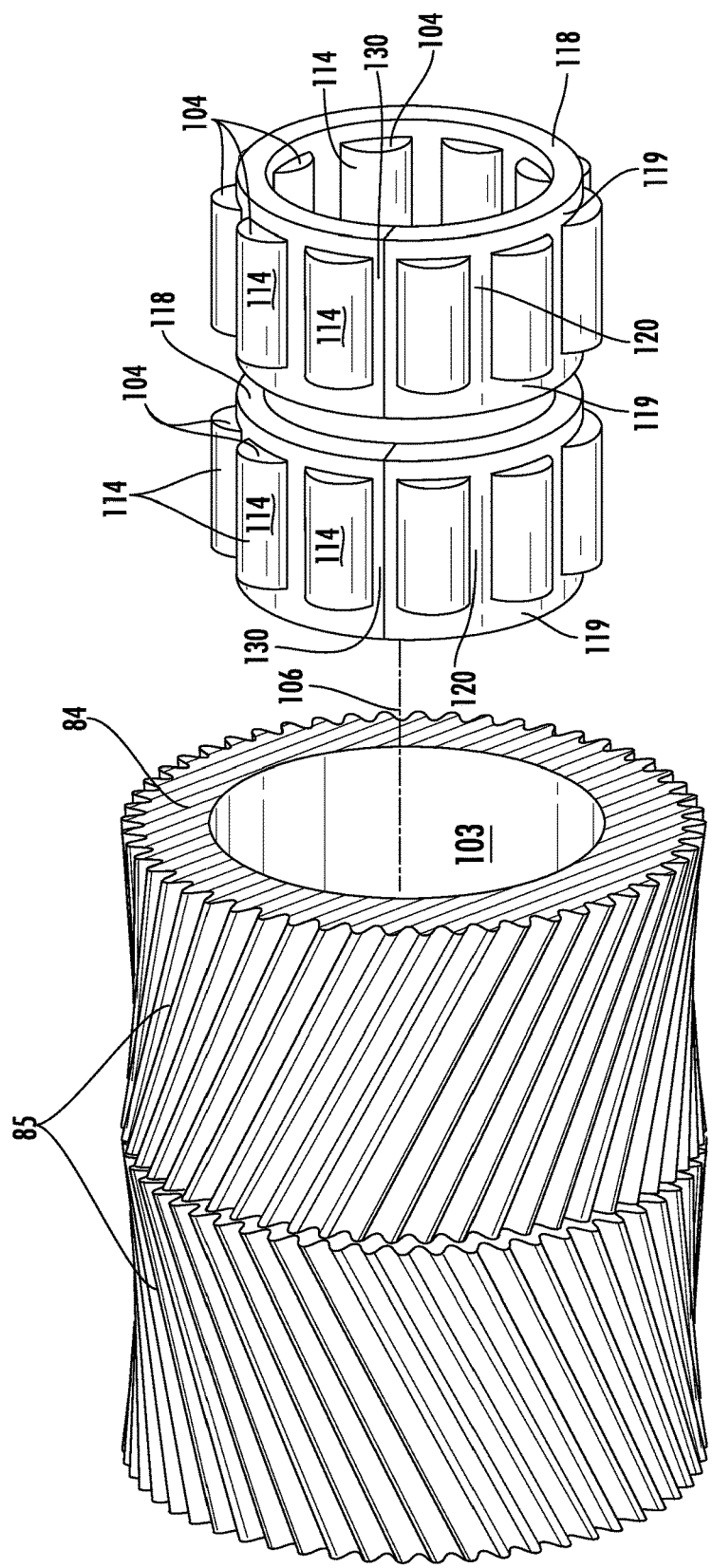
FIG. 5 is an elevated perspective view of disassembled exemplary components of the exemplary gearing arrangement of FIG. 2.
Figure 7:
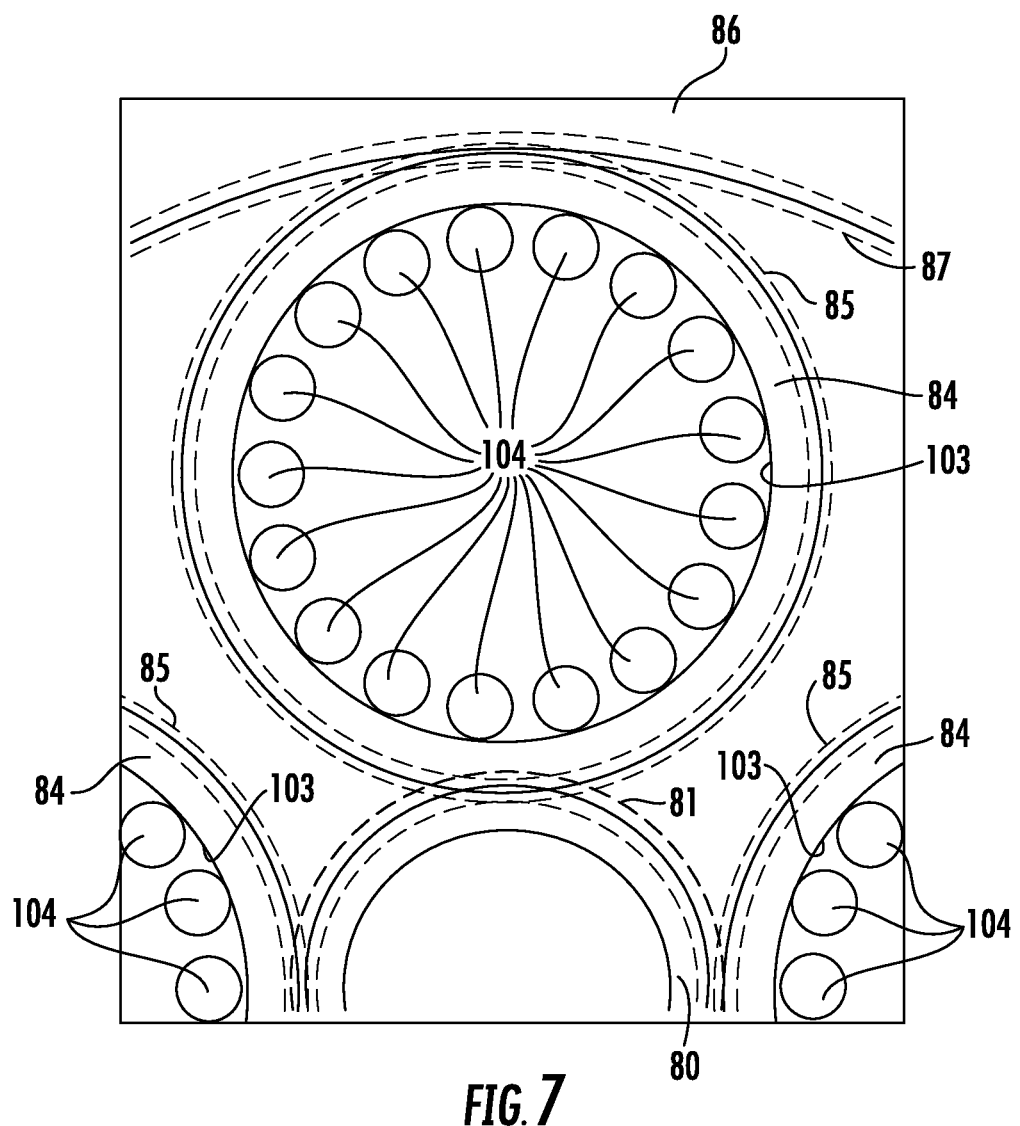
FIG. 7 is a schematic representation of the inter-meshing between the sun gear and three of the planet gears and between one of the planet gears and the ring gear of an epicyclic gearing arrangement.

As schematically shown in FIG. 2 for example, the power gearbox 46 includes a centrally-located sun gear 80 that is rotatable about the longitudinal axis 12 shown in FIG. 1. The bearing that rotationally supports the sun gear 80 has been omitted from the drawings, as the bearing for the sun gear 80 is not the focus of the present disclosure. The sun gear 80 desirably has a double-helical pattern of gear teeth 81. A carrier surrounds the sun gear 80, which is rotatable with respect to the carrier. The carrier carries at least one planet gear 84 and desirably an annular array of planet gears 84. In the illustrated example there are four planet gears 84 but varying numbers of planet gears 84 may be used. As shown in FIGS. 5 and 7, each planet gear 84 desirably has a double helical pattern of gear teeth 85 that are configured to mesh with the gear teeth 81 of the sun gear 80.

As schematically shown in FIGS. 2 and 7 for example, the power gearbox 46 desirably is an epicyclic gearing arrangement having a stationary ring gear 86 that is disposed circumferentially around the sun gear 80 and the planet gears 84. In one exemplary embodiment, the ring gear 86 that surrounds the sun gear 80 and the planet gears 84 is rendered stationary by being coupled to the outer casing 18 in a manner that is not illustrated in the drawings, as this particular arrangement can be performed in any of a number of conventional manners, any one of which being suitable for purposes of illustrating exemplary embodiments of the present disclosure. For example, the ring gear 86 can be fixed (as by being mechanically bolted or welded) to the outer casing 18 via a central circumferential flange 88 that is drilled with a plurality of axial holes 89 therethrough as shown in FIG. 2. In an alternative exemplary embodiment employing a star configuration of an epicyclic gearing arrangement, it is the carrier that is coupled to the outer casing 18, and the specifics of this coupling also are not needed for the explanation of the desired aspects of the present invention. However, in both embodiments, and as schematically shown in FIG. 7 for example, the ring gear 86 is rotatably enmeshed with each planet gear 84, which also is rotatably enmeshed with the sun gear 80, and thus the ring gear 86 also desirably has a double helical pattern of gear teeth 87 configured to mesh with the teeth 85 of the planet gear 84.

Collectively the sun gear 80, the planet gears 84, and the ring gear 86 constitute a gear train. In FIG. 7 for example, there are schematic representations of one complete planet gear 84, portions of two other planet gears 84 and a portion of the sun gear 80 and the ring gear 86. The dashed line with the smaller radius of curvature schematically represents the apexes of the teeth 87 of the ring gear 86, while the dashed line with the larger radius of curvature schematically represents the troughs of the teeth 87 of the ring gear 86. Similarly, the dashed line with the larger radius of curvature schematically represents the apexes of the teeth 85 of the planet gear 84, while the dashed line with the smaller radius of curvature schematically represents the troughs of the teeth 85 of the planet gear 84. In FIG. 7, the dashed line with the larger radius of curvature schematically represents the apexes of the teeth 81 of the sun gear 80, while the dashed line with the smaller radius of curvature schematically represents the troughs of the teeth 81 of the sun gear 80. Each of the planet gears 84 meshes with both the sun gear 80 and the ring gear 86.

The sun gear 80, planet gears 84, and ring gear 86 may be made from steel alloys. One embodiment of the epicyclic gearing arrangement contemplated herein desirably is a planetary configuration that has only a single input and a single output, and the ring gear 86 is held stationary. In operation, the sun gear 80 is turned by an input that is the LP shaft, while the carrier that carries the planet gearboxes is coupled to a mechanical load that is the fan shaft 45 shown in FIG. 1. Thus, the power gearbox 46 is effective to reduce the rotational speed of the sun gear 80 in a known manner to a rotational speed appropriate for the load coupled to the carrier, namely, rotation of the fan shaft 45.

Each of the planet gears 84 is rotatably carried by a bearing that in turn is carried by a planet gearbox that in turn is carried by the carrier. The construction and mounting of the bearing for one planet gear 84 will be described with the understanding that each of the planet gears 84 is constructed and mounted identically, though to different points on the carrier.

Figure 4:
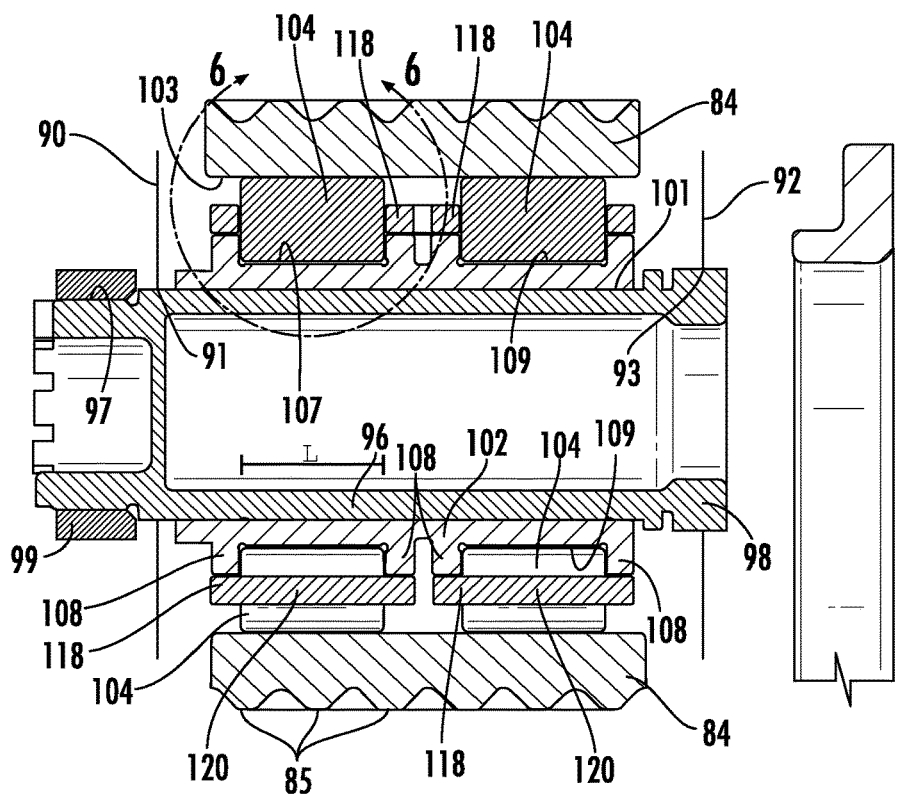
FIG. 4 is a schematic cross-sectional view taken generally along the lines of sight designated 4-4 in FIG. 2.

As schematically shown in FIGS. 2 and 4 for example, the carrier includes a forward wall 90 and an aft wall 92 spaced axially apart from the forward wall 90 and together forming part of the carrier of each planet gearbox. Each of the forward wall 90 and the aft wall 92 respectively defines therethrough a respective coaxial bore 91 and 93. The carrier desirably includes a plurality of sidewalls 94 that extend axially between and connect the forward and aft walls 90, 92 of the carrier. Desirably, pairs of the sidewalls 94 are disposed on opposite sides of the coaxial bores 91, 93 defined respectively in the forward and aft walls 90, 92 of the carrier.

In one exemplary embodiment employing a planetary configuration of an epicyclic gearing arrangement, the carrier is non-rotatably coupled to the fan shaft 45 in a conventional manner so that they rotate in unison at the same speed, but the manner of this coupling is not critical to an understanding of the present disclosure and thus need not be further discussed. In an alternative embodiment employing a star configuration of an epicyclic gearing arrangement, it is the ring gear 86 that is non-rotatably coupled to the fan shaft 45 in a conventional manner so that they rotate in unison at the same speed, but the manner of this coupling is not critical to an understanding of the present disclosure and thus need not be further discussed.

As shown in FIGS. 2-4 and 6 for example, a support pin 96 is hollow, generally cylindrical, and has forward and aft ends. The support pin 96 is provided to mount the bearing of the planet gear 84 to the carrier and thus is configured to be fixed to the carrier. As shown in FIG. 2 for example, each opposite end of the support pin 96 is received in one of the bores 91 and 93 defined in the carrier. As shown in FIGS. 2 and 4 for example, the forward end of the support pin 96 includes a threaded, reduced-diameter surface 97, while the aft end includes an annular, radially-outwardly-extending flange 98. A retainer 99 (in this example a threaded locknut) engages the reduced-diameter surface 97 at the forward end to secure the support pin 96 in position against rearward axial movement.

Figure 3:
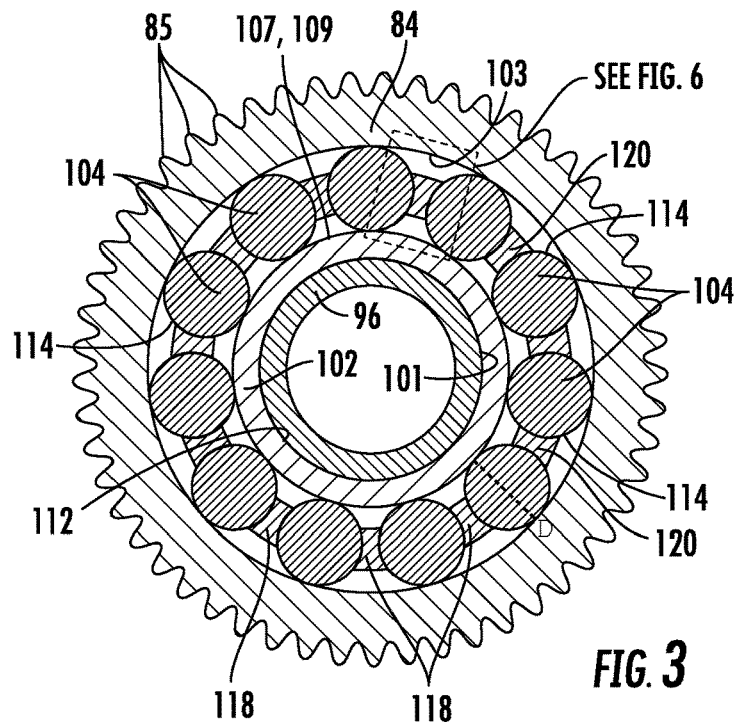
FIG. 3 is a schematic cross-sectional view taken generally along the lines of sight designated 3-3 in FIG. 2.

As shown in FIGS. 3 and 4 for example, the support pin 96 defines a cylindrical outer surface 101. As shown in FIG. 2, the cylindrical outer surface 101 of the support pin 96 is disposed radially equidistant from a central axis 106 that extends in an axial direction through the support pin 96. This central axis 106 also defines the axis of rotation for the planet gear 84.

The support pin 96 desirably includes a plurality of feed holes formed therein and extending radially therethrough, but as the number and placement of these feed holes is conventional as far as the present disclosure is concerned, none of them is shown in the drawings herein. In operation, oil is fed through the opening at the aft end of the support pin 96 and into the interior of the hollow support pin 96 from whence the oil flows through such feed holes to an inner race 102, providing both cooling and lubrication.

As shown in FIG. 3 for example, the planet bearing includes an inner race 102 that defines a cylindrical inner surface 112 that is non-rotatably connected to a cylindrical outer surface 101 of the support pin 96. Desirably, the inner cylindrical surface 112 of the inner race 102 is press-fitted to the cylindrical outer surface 101 of the support pin 96.

Desirably, the planet bearing is inner race guided, and accordingly the inner race 102 desirably is a single integral component having disposed opposite the inner surface 112 an outer surface that defines at least one roller track that defines a roller raceway. Each respective track is defined by a pair of guiderails 108, which are spaced apart from each other in the axial direction and extend circumferentially around the inner race 102 and provide respective guiding surfaces to each respective roller cage 118 (described more fully below). As contemplated herein, the inner race 102 can include a single track or a plurality of tracks such as a dual track inner race 102 or a triple track inner race 102, etc. However, explanation of the structure and operation of the planet gearbox herein will use the specific example of a dual track inner race 102, thus informing how additional tracks would be accommodated or a single track would remain after the elimination of one of the dual tracks.

Accordingly, in a dual track embodiment, the outer surface of the inner race 102 incorporates two pairs of guiderails 108, which extend continuously in the circumferential direction around the inner race 102 and define a pair of annular raceways, a forward raceway 107 and an aft raceway 109, respectively, axially spaced apart from each other. The use of a single inner race 102 with dual raceways 107, 109 spaced axially apart from each other provides for good concentricity between sets of rollers 104, but two separate inner races 102 could be used as well. The axial dimension of the inner race 102 desirably is sized so that the inner race 102 cannot move axially relative to the opposing and axially spaced apart walls 90, 92 of the carrier.

As shown in FIG. 4 for example, each of the pair of tracks extends circumferentially around the outer surface of the inner race 102. Each of the pair of tracks is separated in the axial direction from the other pair of tracks. Each of the pair of tracks is disposed parallel in the circumferential direction with respect to the other pair of tracks. Each of the pair of tracks defines a surface in the form of a raceway 107 or 109 that extends circumferentially and concentrically with respect to the cylindrical inner surface of the 112 of the inner race 102.

Each of the pair of tracks in the inner race 102 is configured to receive and rotatably guide therein a respective plurality of cylindrical rollers 104, which are free to rotate relative to both the inner race 102 and the outer race of the planet bearing. Thus, the raceways 107, 109 of the inner race 102 receive rollers 104, in two tandem rings. A first plurality of cylindrical rollers 104 is rotatably disposed on the forward raceway 107 within a first one of the pair of tracks of the inner race 102. Similarly, a second plurality of cylindrical rollers 104 is rotatably disposed on the aft raceway 109 within a second one of the pair of tracks of the inner race 102. Thus, the raceways 107, 109 of the inner race 102 contact a portion of each of the cylindrical outer surfaces 114 of the cylindrical rollers 104 disposed in the respective track.

Figure 6:
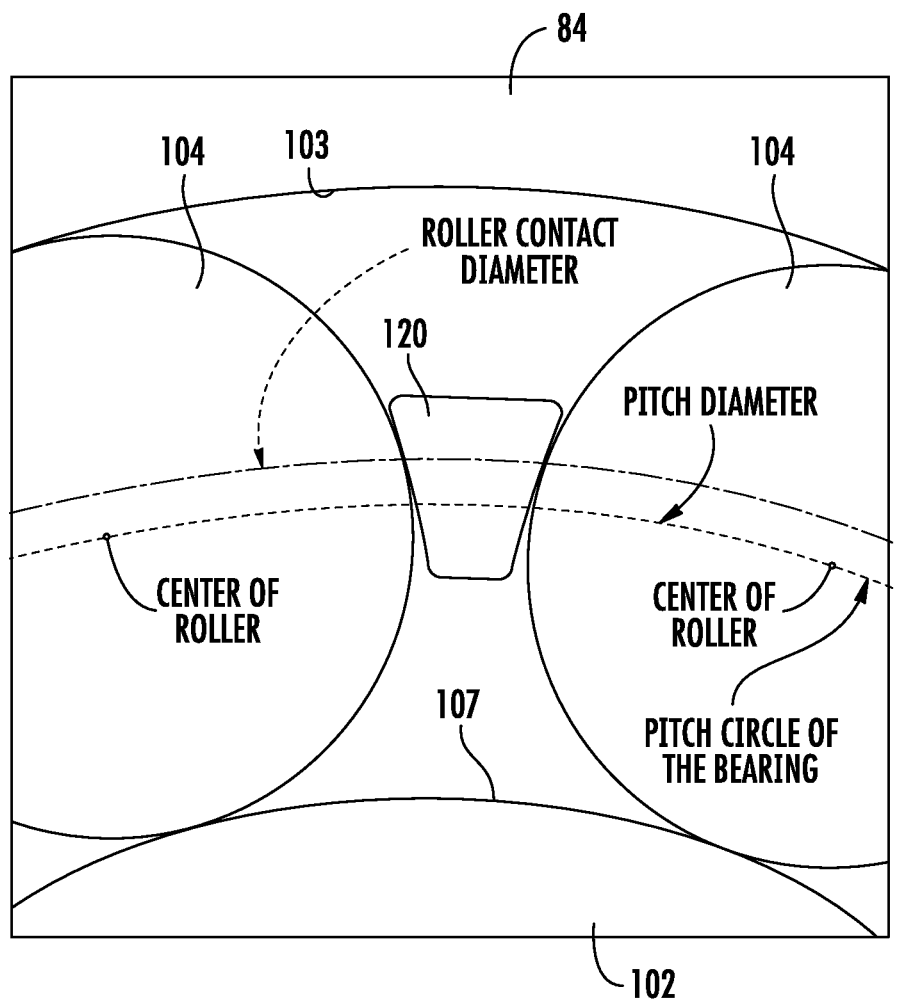
FIG. 6 is an enlarged view of what is shown within the balloon designated by the numeral 6 in FIG. 3.

Leaving aside for the moment the usual rounded corners and crown radius at each opposite end thereof, as schematically shown in FIGS. 2, 5 and 6 for example, in profile view each of the rollers 104 has a uniform cylindrical shape. As shown in FIG. 5 for example, each cylindrical roller 104 defines a cylindrical outer surface 114 that is disposed with a central axis of rotation that extends in the axial direction of the roller 104 and extends in a direction that is parallel to the rotational axis 106 of the rotationally supported planet gear 84. Desirably, at least a central section of the cylindrical outer surface 114 of each cylindrical roller 104 is disposed uniformly equidistant from the roller's central axis of rotation along a central section of the axial length of the cylindrical roller 104. As schematically shown in FIG. 6 for example, each opposite end of each roller 104 will have the usual rounded corners and a conventionally commensurate crown radius, both of which features serving to diminish the diameter of the cylindrical outer surface 114 of the roller 104 at those end locations. It is the central section of the cylindrical outer surface 114 of each roller 104 that is bounded at each opposite end by the rounded corners and crown radius, and it is this central section of the cylindrical outer surface 114 that is the surface that will come into contact with the respective raceway 107, 109 of the inner race 102 during operation of the planet bearing.

As shown in FIG. 3 and FIG. 4 for example, the cylindrical outer surface 114 of each cylindrical roller 104 is defined by a diameter D that is taken at the midpoint of the roller 104 and extends through the central axis of rotation of the roller 104 along a direction that is normal to the central axis of rotation of the roller 104. As shown in FIG. 6 for example, the outer cylindrical surface 114 of each cylindrical roller 104 defines a length L in the direction parallel to the axis of rotation of the cylindrical roller 104. The ratio of each cylindrical roller's length L to each cylindrical roller's diameter D is greater than one. Desirably, the ratio of each cylindrical roller's length to each cylindrical roller's diameter is greater than 1.3. For example, a roller having a diameter D of 29 mm desirably has a length L of 43 mm. Desirably, each cylindrical roller 104 has a length-to-diameter ratio (L / D) that falls within the range from 1.3 to 1.8, inclusive. For example, a roller having a diameter D of 1.25 inches desirably has a length L of 1.6875 inches. The cylindrical rollers 104 can comprise a ceramic material of a known composition, for example silicon nitride ($Si_3Ni_4$).

As shown in FIGS. 3 and 6 for example, the outer race of the planet bearing is formed by the cylindrical interior surface 103 of the planet gear 84. Thus, the outer race 84 of the planet bearing defines an outer cylindrical surface that defines a gearing surface 85 that is configured to mesh with both the gearing surface 81 of the sun gear 80 and the gearing surface 87 of the ring gear 86. Desirably, as shown in FIG. 5 for example, the gearing surface 85 of each cylindrical outer race 84 is patterned with a double helical gearing surface with the bias of each one of the two double helical gearing surfaces of the outer race 84 being disposed nonparallel with the other one of the two double helical gearing surfaces of the outer race 84.

Because each of the gear meshes (sun-to-planet and planet-to-ring) has a double-helical gear tooth profile, there is no relative movement possible between the sun gear 80 and the planet gears 84 in a direction that is parallel to the axis A. Nor is there any movement in this direction between the planet gears 84 and the ring gear 86. The double helical pattern restrains the planet gear 84 axially to both the sun gear 80 and the ring gear 86, and the planet gears 84 are mounted to provide an axial degree of freedom to the carrier.

As shown in FIG. 3 for example, a plurality of cylindrical rollers 104 is disposed between the inner race 102 and the cylindrical interior surface 103 of the planet gear 84 that serves as the outer race of the planet bearing. As shown in FIG. 4 for example, the inner cylindrical surface 103 of the outer race 84 of the planet bearing rotatably contacts both the first plurality of cylindrical rollers 104 and the second plurality of cylindrical rollers 104.

As shown in FIGS. 3-5 for example, the planet gearbox desirably includes a pair of roller cages 118 disposed between the inner race 102 and the outer race 84 and free to rotate with respect to both, but at a different speed than the speed of rotation of the outer race 84. In the embodiment shown in FIGS. 3 and 5 for example, because the inner race 102 has side-by-side dual tracks, a separate roller cage 118 is provided over each of the dual tracks. As shown in FIG. 5 for example, a first roller cage 118 defines a first circumferential row, and a second roller cage 118 defines a second circumferential row separated in the axial direction from the first circumferential row. The circumferential row of each roller cage 118 is disposed above a respective track of the pair of tracks of the inner race 102. Each roller cage 118 is configured with circumferentially extending shoulder elements 119 and axially extending web elements 120 to maintain in each respective track with its respective raceway 107, 109 of the inner race 102, a respective separation in the circumferential direction between each respective cylindrical roller 104 in each pair of circumferentially adjacent cylindrical rollers 104 in that respective track.

Each circumferential row in each roller cage 118 defines a plurality of generally cylindrical openings. Each generally cylindrical opening of the roller cage 118 is defined by a major axis in the axial direction and a minor axis in the circumferential direction. As shown in FIG. 5 for example, each generally cylindrical opening of the roller cage 118 is bounded by a pair of opposing and spaced apart web elements 120 that elongate in the axial direction and by a pair of opposing and spaced apart shoulder elements 119 that elongate in the circumferential direction. The major axis of each generally cylindrical opening is configured to accommodate the length L of an individual roller 104, while the minor axis of each generally cylindrical opening is configured to accommodate the diameter D of an individual roller 104. As shown in FIGS. 3 and 5 for example, the openings in each row are spaced equidistantly apart circumferentially around the roller cage 118 with the number of openings in each row being equal to the number of cylindrical rollers 104 disposed in the respective one of the pair of tracks disposed beneath the respective row of the roller cage 118. Accordingly, as shown in FIG. 5 for example, each respective cylindrical roller 104 is disposed with its cylindrical outer surface 114 extending through a respective opening defined by the roller cage 118.

Desirably, each roller cage 118 can be provided in the form of a circumferentially split cage, which is achieved by having one of the webs 120 split in half along an axial cut. As schematically shown in FIG. 5 for example, a split web 130 is split in half axially along its axial centerline with a small cut that leaves a very slight gap between the opposing edges that are formed in the split web 130 as a result of the cut that axially extends completely through the split web 130. The circumferentially split roller cage 118 so provided, serves to reduce hoop stress in the cage 118.

As shown in FIG. 4 for example, each respective shoulder element 119 of each roller cage 118 is disposed above a respective guiderail 108 of the inner race 102 with a small clearance between the two respective opposing surfaces of the shoulder element 119 and the guiderail 108. Because the planet bearing is inner-race-guided, the roller cage 118 is designed with a small clearance between the cylindrically-shaped, circumferential inner surface defined by the shoulder elements 119 of the cage 118 and the cylindrically-shaped, circumferential outer surfaces of the guiderails 108 of the inner race 102, and this small clearance desirably is on the order of 0.005 to 0.050 inches inclusive.

As shown in circumferential cross-section in FIGS. 3 and 6 and in axial cross-section in FIG. 4 for example, respective web elements 120 of each roller cage 118 are disposed to extend axially between the opposing shoulder elements 119 of the roller cage 118. Each of these web elements 120 defines a web 120 of the roller cage 118 that is shown in cross-section in FIG. 6, which for the sake of avoiding undue complexity in the drawing, does not have any cross-hatching that normally would be found in a cross-sectional view of a metal component such as the web 120 of the roller cage 118 or the cylindrical rollers 104. All of the webs 120 of both roller cages 118 are identically configured and dimensioned.

As shown in FIG. 6, the transverse, cross-sectional outline of each web 120 resembles a trapezoid with the non-parallel side legs of the trapezoid outlining the sides of the web 120. Each opposite side of each web 120 will contact the outer cylindrical surface 114 of an adjacent cylindrical roller 104 at a particular point on the side leg of the trapezoid, and two times the distance from the centerline 106 (FIG. 5) of the bearing to this point where the cylindrical roller 104 contacts the web 120 is called the "roller contact diameter" of the web 120.

Also shown in FIG. 6, is a dashed line that designates what is known as the "pitch circle" of the planet bearing. The long curved dashed line in FIG. 6 is a virtual line that is drawn through the central axis of rotation of each of the cylindrical rollers 104 and would form a complete circle if all of the rollers were shown in FIG. 6 as the rollers 104 are schematically shown in FIG. 7. The diameter of the "pitch circle" of the bearing is the bearing's "pitch diameter". The thickness of the web 120 of interest herein is the length of the portion of the pitch circle that lies between the two non-parallel side legs of the web 120 in the view shown in FIG. 6. This web thickness of interest herein can be calculated by measuring the angular ratio of the pitch circle that lies between the two non-parallel legs of the web, and multiplying it by the circumference of the pitch circle of the bearing.

Each of the openings defined by the roller cage 118 is spaced equidistantly apart circumferentially around the cage by a plurality of equidistantly spaced apart webs 120, and each web 120 extends in the axial direction and defines a cross-web thickness in the circumferential direction. That cross-web thickness of each web 120 is in fact the ratio of the "web thickness" of the web 120 measured as described above divided by the roller diameter. In accordance with an aspect of the present invention, each web 120 of the respective roller cage 118 has a cross-web thickness that desirably measures 15% to 25% of the diameter of one of the cylindrical rollers 104. In another embodiment, each web 120 of the respective roller cage 118 has a cross-web thickness that desirably measures 15% to 20% of the diameter of one of the cylindrical rollers 104.

In some sense, these reductions in the cross-web thickness of each web 120 are rendered feasible due to the shape of the roller cage 118. This desirable shape of the roller cage 118 in turn is made possible due to the relatively high ratio of the diameter of the outer race 84 to the diameter of the inner race 102. The relatively high ratio of the diameter of the outer race 84 (measured at the inner surface 103 thereof) to the diameter of the inner race 102 (measured at the surface defining the raceway 107, 109 thereof) results from a large diameter of the rollers 104 compared to the pitch diameter of the bearing. Because of this relatively high ratio between the roller's diameter and the bearing's pitch diameter, sufficient space exists between the rollers 104 radially outside the pitch circle (FIG. 6) to allow the thickness of the web 120 to increase markedly above the pitch circle, and this circumferential thickening of the web 120 radially outbound of the planet bearing's pitch circle in turn affords a reduction in the circumferential spacing between rollers 104 at the pitch line of the web 120. Thus, in an exemplary embodiment in which the cross-web thickness measures 15% to 25% of the diameter of one of the cylindrical rollers 104, this ratio would be on the order of 0.200 to 0.600 inclusive.

The planet gearbox with its planet bearing apparatus described herein has several advantages over the prior art. Briefly, the planet bearing apparatus described herein reduces the diameter of the planet gearbox that is required to transfer a given amount of power. The benefit in terms of cage thickness comes from having the cage outside of the pitch circle of the bearing, and with a large ratio of roller diameter to bearing pitch diameter (and therefore also a high ratio of outer race diameter to inner race diameter). The smaller that this web thickness of interest herein can be made, the more rollers of the same size can be fit inside a bearing with a fixed outer race diameter, which is the diameter that connects the center of the bearing and two points separated by 180 degrees on the cylindrical interior surface 103 of the planet gear 84. For a fixed outer race diameter, the more rollers of the same size that are fit in the bearing, the greater the load carrying capacity of the bearing. Similarly, by being able to achieve a greater load carrying capacity for the same outer race diameter, it is possible to achieve a smaller bearing with an equivalent bearing load capacity by the same method of reducing the web thickness within the bearing. The smaller the diameter of the planet bearing, then the smaller the diameter of the planet gear 84 with that smaller diameter planet bearing. The smaller the diameter of the planet gear 84, the more room becomes available for other components of the engine. Additionally, the smaller the diameter of the planet gear 84 translates into a greater reduction in the size and weight of the overall engine 10.

For the embodiment depicted, the planet roller bearing may be formed of any suitable material. For example, in at least certain exemplary embodiments, the roller bearing may be formed of a suitable metal material, such as a chrome steel or a high carbon chrome steel. Alternatively, however in other exemplary embodiments the planet roller bearing may include one or more components formed of a suitable ceramic material.

The use of ceramic cylindrical rollers 104 allows the planet gears 84 to have a degree of freedom in the axial direction, simplifying the design. The ceramic rollers 104 are anticipated to provide at least a doubling in life compared to steel rollers, allowing the gearbox 46 to meet reliability targets. The ceramic rollers 104 also bring excellent oil-off performance, low oil flow requirements, low heat generation, and light weight design as additional benefits. Commercially, the design will have a long life, which will minimize the cost of replacement over the life of the product.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A planet gearbox for connection to a carrier of an epicyclic gearing arrangement that has only a single input and a single output and that includes a sun gear and a ring gear surrounding the planet gearbox and the sun gear, the planet gearbox comprising:
    a support pin configured to be fixed to the carrier and defining a cylindrical outer surface that is radially equidistant from a central axis that extends in an axial direction;
    an inner race defining a cylindrical inner surface that is non-rotatably connected to the cylindrical outer surface of the support pin, the inner race defining an outer surface that defines at least one track, each track defined in the outer surface being configured to receive and rotatably guide therein a respective plurality of cylindrical rollers;
    a respective plurality of cylindrical rollers rotatably disposed within each respective track of the inner race;
    wherein each roller defines a cylindrical outer surface that is disposed with an axis of rotation that extends in a direction parallel to the axial direction, and the cylindrical outer surface of each roller is defined by a diameter that extends through the axis of rotation along a direction that is normal to the axis of rotation, wherein the outer cylindrical surface of each roller defines a length in the direction parallel to the axis of rotation of the roller, and the ratio of each roller's length to each roller's diameter is within the range from 1.3 to 1.8, inclusive;
    an outer race defining an inner cylindrical surface contacting each respective plurality of cylindrical rollers, the outer race defining an outer cylindrical surface that defines a gearing surface that is configured to mesh with both the sun gear and the ring gear; and
    for each respective track, a respective roller cage disposed between the inner race and the outer race, wherein there is a small clearance between each roller cage and the inner race, each respective roller cage being configured to maintain in each respective track a respective separation between each respective roller in each pair of adjacent rollers in that respective track, each roller cage defining a first plurality of generally cylindrical openings, each generally cylindrical opening defining a major axis in the axial direction and a minor axis in the circumferential direction, each of the openings being spaced equidistantly apart circumferentially around the respective roller cage by a plurality of equidistantly spaced apart webs, wherein:
        each web has a trapezoidal cross-sectional perimeter outline with non-parallel sides,
        each web extends in the axial direction,
        each web defines a cross-web thickness in the circumferential direction,
        each web is bisected radially by a pitch circle of a planet bearing,
        the cross-web thickness increases above the pitch circle of the planet bearing, and
        wherein the diameter of one of the rollers establishes a cross-web thickness along the pitch circle of the planet bearing for each web of each roller cage so that each cross-web thickness is 15% to 25% of the diameter of one of the rollers.

2. The planet gearbox of claim 1, wherein each web of each roller cage has a cross-web thickness that measures 15% to 20% of the diameter of one of the rollers.

3. The planet gearbox of claim 1, wherein the small clearance between the roller cage and each inner race is on the order of 0.005 to 0.050 inches inclusive.

4. The planet gearbox of claim 3, wherein each track defines a pair of guiderails, which extend continuously in the circumferential direction around the outer surface of the inner race and radially outwardly from an annular raceway defined in the outer surface of the inner race, wherein the small clearance between each roller cage and the inner race is defined between the respective roller cage and the respective guiderails of the respective track of the inner race.

5. The planet gearbox of claim 1, wherein the generally cylindrical openings in each respective roller cage are aligned in a circumferential row disposed above a respective track of the inner race, each generally cylindrical opening of the respective roller cage is bounded in the circumferential direction by a pair of opposing and spaced apart shoulder elements, wherein each respective roller is disposed with its cylindrical outer surface extending through a respective opening defined by the respective roller cage, wherein the small clearance between each respective roller cage and the respective track of the inner race is defined between the respective shoulder elements of the respective roller cage and the respective guiderails of the respective track of the inner race.

6. The planet gearbox of claim 1, wherein at least one of the webs of at least one roller cage is a split web.

7. The planet gearbox of claim 1, wherein the gearing surface of each cylindrical outer race is a double helical gearing surface with the bias of each one of the two double helical gearing surfaces of the outer race being disposed nonparallel with the other one of the two double helical gearing surfaces of the outer race.

8. The planet gearbox of claim 1, wherein each track extends circumferentially around the outer surface of the inner race, each track defining a raceway surface extending circumferentially and concentrically with respect to the inner cylindrical surface of the inner race and contacting a portion of each of the cylindrical outer surfaces of the rollers disposed in the respective track, each track defining a pair of radially extending sidewalls that are spaced apart in the axial direction from each other.

9. The planet gearbox of claim 1, wherein the inner cylindrical surface of the inner race is press-fitted to the cylindrical outer surface of the support pin.

10. The planet gearbox of claim 1, wherein each of the rollers is formed of ceramic material.

11. The planet gearbox of claim 1, wherein each side of the pair of sides contacts the outer cylindrical surface of an adjacent cylindrical roller at a single roller contact diameter of the web, and the single roller contact diameter is greater than a diameter of the pitch circle of the planet bearing.

12. The planet gearbox of claim 1, wherein the outer race is engaged with the ring gear.

13. A gas turbine engine comprising:
a fan including a plurality of blades extending radially from a hub and rotatable about a first axis of rotation defined centrally through the hub;
a compressor disposed downstream from the fan;
a turbine disposed downstream of the compressor;
a rotatable input shaft mechanically coupling the compressor to rotate in unison with the turbine;
an epicyclic gearing arrangement that has only a single input and that includes a carrier, a sun gear rotatable about a second axis of rotation that is parallel to the first axis of rotation, a ring gear disposed circumferentially around the sun gear, at least one planet gearbox that is carried by the carrier and houses a planet gear rotatable with respect to the carrier about a third axis of rotation that is parallel to the second axis of rotation, wherein the at least one planet gear meshes with both the sun gear and the ring gear; and
an engine envelope surrounding the fan, the compressor, the turbine and the epicyclic gearing arrangement, wherein one of the ring gear and the carrier is non-rotatably coupled to the engine envelope; and
the planet gearbox further including:
  a support pin fixed to the carrier and defining a cylindrical outer surface that is equidistant from a central axis that extends in an axial direction,
  an inner race defining an inner cylindrical surface that is non-rotatably connected to the cylindrical outer surface of the support pin, the inner race defining an outer surface that defines at least one track, each track being configured to receive and rotatably guide therein a respective plurality of cylindrical rollers,
  an outer race defining an outer cylindrical surface that defines a gearing surface of the planet gear and that is configured to mesh with both the sun gear and the ring gear, the outer race defining an inner cylindrical surface that is opposed to the outer cylindrical surface of the outer race,
  a plurality of rollers disposed in each track of the inner race, each roller being free to rotate about a fourth axis of rotation that is parallel to the third axis of rotation, each roller defining a cylindrical outer surface contacting both the inner race and the inner cylindrical surface of the outer race, each roller defining a length in the direction parallel to the fourth axis of rotation and wherein the ratio of each roller's length to each roller's diameter is within the range from 1.3 to 1.8, inclusive, and
  for each respective track, a respective roller cage disposed between the inner race and the outer race, wherein there is a small clearance between each roller cage and the inner race, each respective roller cage being configured to maintain in each respective track, a respective separation between each respective roller in each pair of adjacent rollers in that respective track, each roller cage defining a first plurality of generally cylindrical openings, each generally cylindrical opening defining a major axis in the axial direction and a minor axis in the circumferential direction, each of the openings being spaced equidistantly apart circumferentially around the respective roller cage by a plurality of equidistantly spaced apart webs, wherein:
    each web has a trapezoidal cross-sectional perimeter outline with non-parallel side sides,
    each web extends in the axial direction,
    each web defines a cross-web thickness in the circumferential direction,
    each web is bisected radially by a pitch circle of a planet bearing,
    the cross-web thickness increases above the pitch circle of the planet bearing, and
    wherein the diameter of one of the rollers establishes a cross-web thickness along the pitch circle of the planet bearing for each web of each roller cage so that each cross-web thickness is 15% to 25% of the diameter of one of the rollers.

14. The planet gearbox of claim 13, wherein the small clearance between the roller cage and each inner race is on the order of 0.005 to 0.050 inches inclusive.

15. The planet gearbox of claim 14, wherein each track defines a pair of guiderails, which extend continuously in the circumferential direction around the outer surface of the inner race and radially outwardly from an annular raceway defined in the outer surface of the inner race, wherein the small clearance between each roller cage and the inner race is defined between the roller cage and the guiderails of the inner race.

16. The planet gearbox of claim 13, wherein each roller cage defines a circumferential row disposed above a respective track of the inner race, each circumferential row defining a plurality of generally cylindrical openings, each generally cylindrical opening defining a major axis in the axial direction and a minor axis in the circumferential direction, the openings in each row being spaced equidistantly apart circumferentially around the respective cage with the number of openings in each row being equal to the number of rollers disposed in the respective track disposed beneath the respective row of the respective roller cage, wherein each respective roller is disposed with its cylindrical surface extending through a respective opening defined by the respective roller cage.

17. The gas turbine engine of claim 13, wherein the compressor is a low pressure compressor, wherein the turbine is a low pressure turbine, and wherein the shaft is a low pressure shaft mechanically coupling the low pressure compressor to the low pressure turbine.

18. The planet gearbox of claim 13, wherein the ratio of each roller's length to each roller's diameter is greater than 1.3.

19. The planet gearbox of claim 13, wherein each roller has a length-to-diameter ratio that falls within the range from 1.3 to 1.8, inclusive.

20. The planet gearbox of claim 13, wherein the gearing surface of each cylindrical outer race is a double helical gearing surface with the bias of each one of the two double helical gearing surfaces of the outer race being disposed nonparallel with the other one of the two double helical gearing surfaces of the outer race.

* * * * *